(12) United States Patent
Nagaoka (10) Patent No.: US 11,285,675 B2
(45) Date of Patent: Mar. 29, 2022

(54) PROCESSING APPARATUS FOR ELONGATED STRUCTURE AND MANUFACTURING METHOD FOR ELONGATED STRUCTURE

(71) Applicants: NOK CORPORATION, Tokyo (JP); NOK Elastomers Processing Co., Ltd., Fukuoka (JP)

(72) Inventor: Hisayuki Nagaoka, Fukuoka (JP)

(73) Assignees: NOK CORPORATION, Tokyo (JP); NOK ELASTOMERS PROCESSING CO., LTD., Fukuoka (JP)

( * ) Notice: Subject to any disclaimer, the term of this patent is extended or adjusted under 35 U.S.C. 154(b) by 57 days.

(21) Appl. No.: 16/787,188

(22) Filed: Feb. 11, 2020

(65) Prior Publication Data
US 2020/0254696 A1    Aug. 13, 2020

(30) Foreign Application Priority Data

Feb. 12, 2019   (JP) .............................. JP2019-022636

(51) Int. Cl.
*B29C 65/00*      (2006.01)
*B29C 65/70*      (2006.01)
(Continued)

(52) U.S. Cl.
CPC .......... *B29C 65/70* (2013.01); *B29C 66/1142* (2013.01); *B29C 65/2015* (2013.01);
(Continued)

(58) Field of Classification Search
CPC . B29C 65/2015; B29C 65/2023; B29C 65/70; B29C 65/7841; B29C 66/348; B29C 66/69; B29C 66/1142
See application file for complete search history.

(56) References Cited

U.S. PATENT DOCUMENTS 5,110,274 A * 5/1992 Hatai ...................... B29C 33/02
                                            425/28.1
5,536,464 A * 7/1996 Muramatsu ......... B29C 35/0277
                                            156/140

FOREIGN PATENT DOCUMENTS

CN        103568164 A     2/2014
CN        208180235 U    12/2018
(Continued)

OTHER PUBLICATIONS

English translation of CN 103568164 (Year: 2014).*
(Continued)

*Primary Examiner* — Philip C Tucker
*Assistant Examiner* — Nickolas R Harm
(74) *Attorney, Agent, or Firm* — Greenblum & Bernstein, P.L.C.

(57) ABSTRACT

An apparatus for processing an elongated structure includes a mold within which an uncross-linked rubber material is placed, at least one heating unit configured to heat the mold, and a pressure device configured to press the rubber material using the mold heated by the heating unit to promote shaping the rubber material by the mold while proceeding the cross-linking of the rubber material. The heating unit includes a central heating device configured to heat a longitudinal central portion of the mold, multiple cooling devices configured to cool two longitudinal end portions of the mold, multiple intermediate heating devices configured to heat two intermediate portions between the longitudinal central portion and the longitudinal end portions of the mold, heat shield plates disposed between the central heating device and the intermediate heating devices, and heat shield plates disposed between the cooling devices and the intermediate heating devices.

6 Claims, 6 Drawing Sheets

(51) Int. Cl.
    *B29L 31/00*     (2006.01)
    *B29C 65/78*     (2006.01)
    *B29C 65/20*     (2006.01)

(52) U.S. Cl.
    CPC ...... *B29C 65/2023* (2013.01); *B29C 65/7841* (2013.01); *B29C 66/348* (2013.01); *B29C 66/69* (2013.01); *B29L 2031/7096* (2013.01)

(56) References Cited

FOREIGN PATENT DOCUMENTS

| | | | |
|---|---|---|---|
| JP | 2002120231 A | * | 4/2002 |
| JP | 2013-220581 | | 10/2013 |

OTHER PUBLICATIONS

English translation of JP 2002/120231 (Year: 2002).*
Taiwan Official Action issued in Application No. 109212233650, dated Dec. 18, 2020.
China Office Action issued in CN Application No. 202010086678.1, dated Jul. 22, 2021.
Second Office Action dated Dec. 21, 2021 in corresponding Chinese Application No. 202010086678.1, along withan English translation thereof.

* cited by examiner

PROCESSING APPARATUS FOR ELONGATED STRUCTURE AND MANUFACTURING METHOD FOR ELONGATED STRUCTURE

TECHNICAL FIELD

The present invention relates to apparatuses for processing elongated structures made of rubber material and relates to methods for manufacturing elongated structures.

BACKGROUND ART

A technique for manufacturing an elongated structure using rubber as a material is conducted by placing an uncross-linked rubber material in a cavity inside a mold and applying pressure and heat to the rubber material through the mold to cross-link the rubber material.

There is a technique for joining ends of elongated structures formed of rubber. For example, multiple elongated structures can be joined to produce a longer elongated structure or a loop structure, i.e., a ring. Alternatively, a loop structure can be manufactured by joining both ends of a single elongated structure. Patent Document 1 discloses a technique for joining ends of elongated structures by proceeding cross-linking of rubber.

BACKGROUND DOCUMENTS

Patent Documents

Patent Document 1. JP-A-2013-220581

SUMMARY OF THE INVENTION

In the process of manufacturing a rubber elongated structure, it is preferable to heat the central portion of the combined elongated structures and to cool the end portions for restraining cross-linking of the end portions. However, in a case in which the difference between the temperature of the central portion and the temperature of the end portions is large, an abnormality may occur in the elongated structure, such as deformation, sticking, and/or foaming.

Accordingly, the present invention provides an apparatus for processing an elongated structure made of a rubber material that can optimize the temperature distribution of the elongated structure to be manufactured.

An apparatus for processing an elongated structure according to an aspect of the present invention includes a mold within which an uncross-linked rubber material is to be placed, at least one heating unit configured to heat the mold, and a pressure device configured to press the rubber material using the mold heated by the heating unit to promote shaping the rubber material by the mold while proceeding the cross-linking of the rubber material. The heating unit includes a central heating device configured to heat a longitudinal central portion of the mold, multiple cooling devices configured to cool two longitudinal end portions of the mold, multiple intermediate heating devices configured to heat two intermediate portions between the longitudinal central portion and the longitudinal end portions of the mold, heat shield plates disposed between the central heating device and the intermediate heating devices, and heat shield plates disposed between the cooling devices and the intermediate heating devices.

In this aspect, the longitudinal central portion of the mold for shaping the central portion of the elongated structure is heated by the central heating device. The two longitudinal end portions of the mold for shaping the end portions of the elongated structure are also cooled by multiple cooling devices. In addition, the two intermediate portions between the longitudinal central portion and the longitudinal end portions of the mold are heated by multiple intermediate heating devices, which are different from the central heating device. Heat shield plates are disposed between the central heating device and the intermediate heating devices, whereas other heat shield plates are also disposed between the cooling devices and the intermediate heating devices. Therefore, it is possible to provide an appropriate temperature distribution to multiple portions of the mold, and thus, to multiple portions of the elongated structure. For example, it is possible to proceed cross-linking of rubber at the central portion of the elongated structure and to restrain cross-linking of rubber at the end portions of the elongated structure, while at the same time reducing abnormality in the elongated structure, such as deformation, sticking, and/or foaming.

Preferably, the apparatus further includes a control device configured to control heating of the central heating device and the intermediate heating devices. In this case, it is possible to provide a more suitable temperature distribution to the portions of the mold, and thus, to the portions of the elongated structure.

A method of manufacturing an elongated structure according to an aspect of the present invention is a method of manufacturing an elongated structure using the processing apparatus, including placing the uncross-linked rubber material within the mold; and molding an elongated structure from the rubber material while pressurizing the rubber material within the mold by the pressurizing device. Molding the elongated structure includes heating the longitudinal central portion of the mold by the central heating device to heat a longitudinal central portion of the rubber material, heating the intermediate portions of the mold by the intermediate heating devices, which is controlled at a temperature lower than a temperature of the central heating device, to heat the rubber material, and cooling the longitudinal end portions of the mold by the cooling devices to cool the longitudinal end portions of the mold to cool longitudinal end portions of the rubber material.

In this aspect, it is possible to provide an appropriate temperature distribution to multiple portions of the mold, and thus, to multiple portions of the elongated structure. For example, it is possible to proceed cross-linking of rubber at the central portion of the elongated structure and to restrain cross-linking of rubber at the end portions of the elongated structure tile reducing abnormality in the elongated structure, such as deformation, sticking, and/or foaming.

The method of manufacturing an elongated structure may further include placing two segments, each of which is obtained by molding an elongated structure, within the mold, such that an end of a segment and an end of the other segment are adjacent to each other; and joining the segments while pressurizing the segments within the mold by the pressurizing device. Joining the segments includes heating the longitudinal central portion of the mold by the central heating device to heat the ends of the two segments, heating the intermediate portions of the mold by the intermediate heating devices, which is controlled at a temperature lower than a temperature of the central heating device, to heat the two segments, and cooling the longitudinal end portions of the mold by the cooling devices to cool longitudinal central portions of the two segments by the cooling devices.

In this case, it is possible to heat the ends of the segments at which cross-linking of rubber was restrained at a low temperature during molding the segments at a high temperature by the central heating device during the joining of the segments, and to cool the longitudinal central portion of the segment at which cross-linking of rubber was proceeded at a high temperature during molding the segments by the cooling device during the joining of the segments. In this way, repeated heating to high temperatures of the same portions can be avoided and excessive cross-linking of rubber can be restrained.

DESCRIPTION OF EMBODIMENT

Hereinafter, with reference to the accompanying drawings, an embodiment according to the present invention will be described. It is noted that the drawings are not necessarily to scale, and certain features may be shown exaggerated or omitted.

In the following description, processing of a rubber material using peroxide cross-linking will be described as an example. In a case in which peroxide is used as a cross-linking agent, oxygen in the air prevents the progression of the peroxide cross-linking, and therefore, the processing environment of the rubber is degassed. However, the following description is not intended to limit the present invention. The present invention may also be applied to processing of rubber using other types of cross-linking, and the processing environment of the rubber is not required to be degassed.

Figure 1:
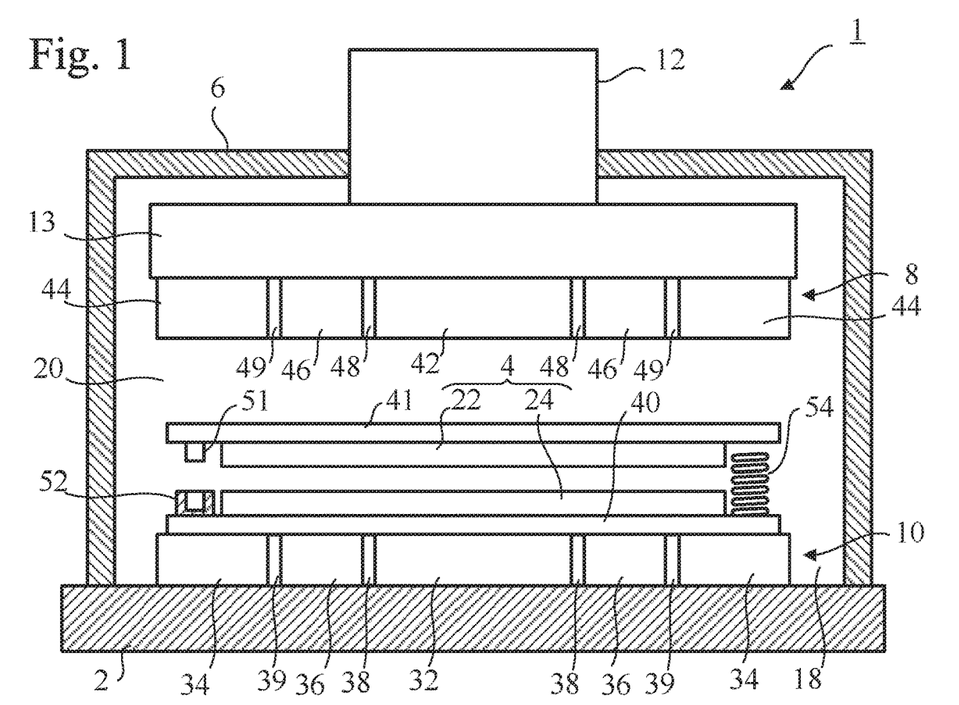
FIG. 1 is a front view of an apparatus for processing an elongated structure according to an embodiment of the present invention, in which a part is cut away.
Figure 2:
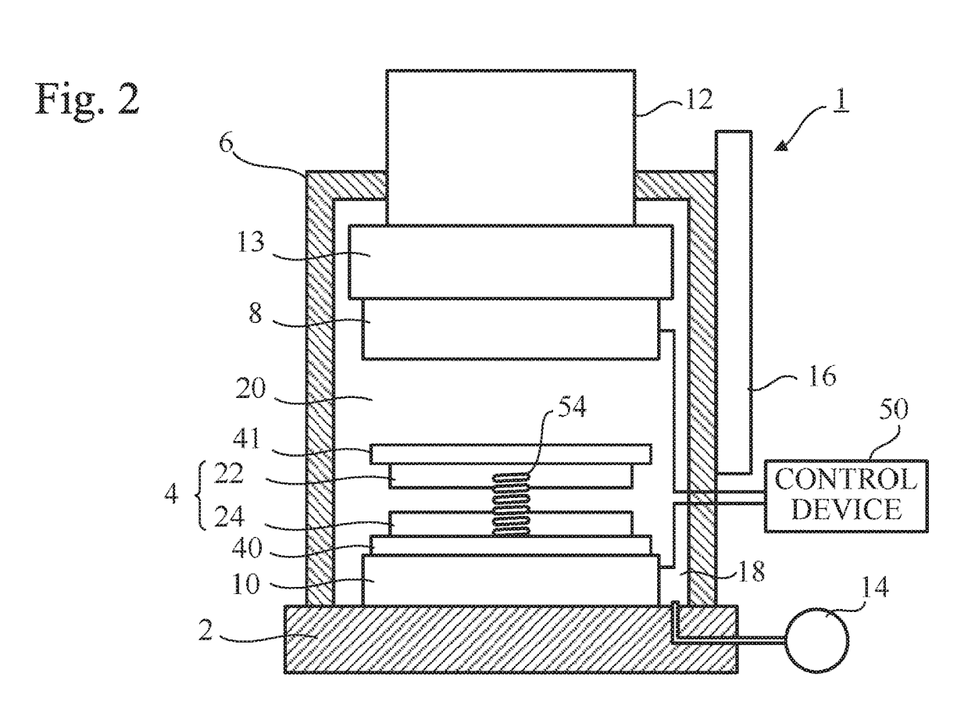
FIG. 2 is a side view of the processing apparatus, in which a part is cut away.

As shown in FIGS. 1 and 2, a processing apparatus 1 for an elongated structure according to an embodiment includes a platform 2, a mold 4, a housing 6, an upper heating unit 8, a lower heating unit 10, a pressurizing cylinder (pressure device) 12, a degassing pump 14, and an elevating device 16.

The platform 2 is a fixed platform that supports the mold 4 and other components. The housing 6 is arranged so as to be movable up and down by the elevator device 16 with respect to the platform 2. The elevating device 16 is, for example, a hydraulic cylinder, a pneumatic cylinder, a rack and pinion, or other drive device for lifting and lowering the housing 6.

The housing 6 is of a box shape having an opening 18 at the lower part thereof. When the housing 6 is lowered, the housing 6 cooperates with the platform 2 to define a containment space 20. The degassing pump 14 depressurizes and degasses the containment space 20.

Figure 3:
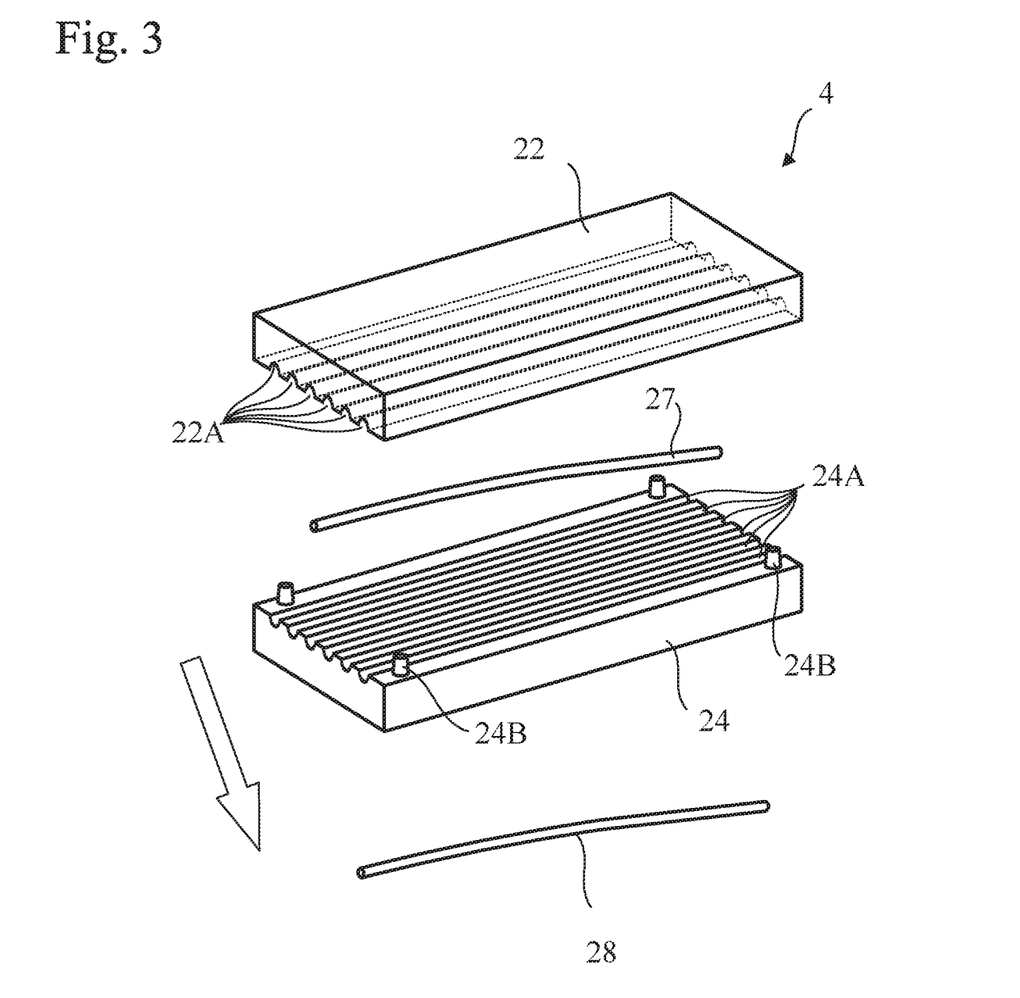
FIG. 3 is a perspective view showing a mold of the processing apparatus together with an example of a method of using the processing apparatus.

The mold 4 is a metallic mold, and as shown in FIG. 3, includes an upper mold 22 and a lower mold 24. On the lower surface of the upper mold 22, multiple semi-cylindrical shaping grooves 22A are formed and are arranged parallel to one another. Multiple semi-cylindrical shaping grooves 24A are also formed on the upper surface of the lower mold 24, and the shaping grooves 24A are arranged parallel to one another. The shaping grooves 22A are respectively aligned with the shaping grooves 24A to form multiple cylindrical shaping cavities.

In addition, multiple positioning pins 24B project from the upper surface of the lower mold 24. The lower surface of the upper mold 22 is formed with multiple holes (not shown) into which the positioning pins 24B are fitted. The positioning pins 24B are inserted into the holes so that the position of the upper mold 22 is aligned with the lower mold 24, resulting in the shaping grooves 22A being respectively aligned with the shaping grooves 24A. Conversely, the positioning pins 24B may be fixed to the upper mold 22 and corresponding holes may be formed in the lower mold 24.

Each of the shaping cavities of the mold 4 is used to form a rod or an elongated structure from an uncross-linked rubber material 27. An uncross-linked rubber material 27 to which a peroxide cross-linking agent is added is placed in each shaping groove 24A, and the rubber materials 27 are molded by the pairs of shaping grooves 22A and 24A to produce processed elongated structures 28. The rubber material 27 shown in FIG. 3 is a rod having a shape similar to the elongated structure 28 obtained. However, the rubber materials 27 may also be plates, and in this case, rods or elongated structures 28 are shaped from the plates by the pairs of shaping grooves 22A and 24A.

Thereafter, the upper mold 22 is placed on the lower mold 24, and the rubber materials 27 are disposed in the shaping cavities formed by the pairs of shaping grooves 22A and 24A. By using the mold 4, heat and pressure are applied to each rubber material 27 for advancing the cross-linking reaction of the rubber to complete the cured elongated structure 28. As will be described later, in the elongated structure 28, cross-linking of the rubber progresses at the longitudinal central portion, but cross-linking of the rubber at the end portions is restrained and is not sufficient.

Figure 4:
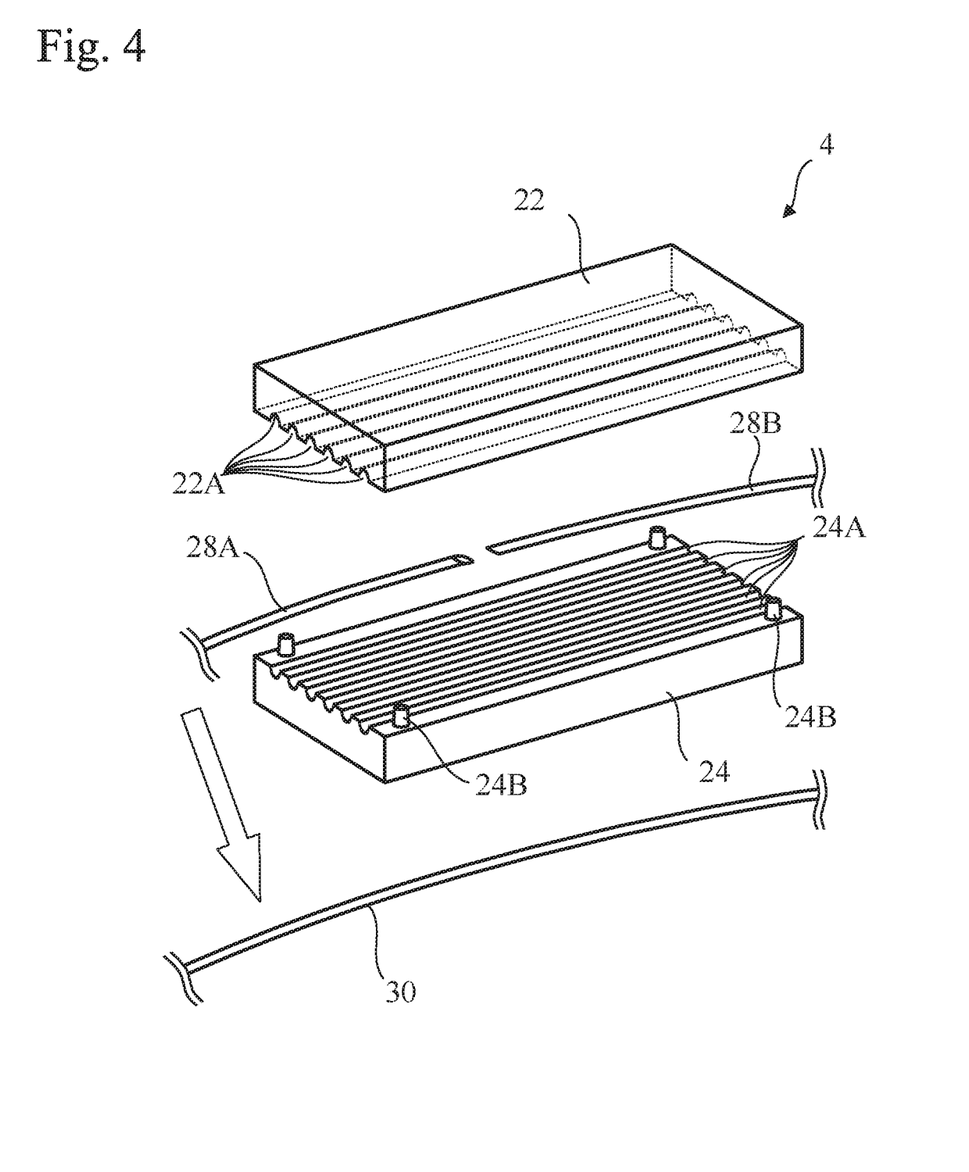
FIG. 4 is a perspective view showing a mold of the processing apparatus together with an example of a method of using the processing apparatus.

As shown in FIG. 4, each of the shaping cavities of the mold 4 may also be used to join ends of two elongated structures (segments) 28A and 28B formed of rubber in the manner described above to form a longer elongated structure 30. Specifically, the elongated structures 28A and 28B are placed in each shaping groove 24A. At this time, one end of the elongated structure 28A and one end of the elongated structure 28B are brought into close proximity to each other, for example, in contact with each other. The ends of the elongated structures 28A and 28B are in a state in which the cross-linking is not yet sufficient.

Thereafter, the upper mold 22 is stacked on the lower mold 24, such that the elongated structures 28A and 28B are disposed in the shaping cavities each constituted of a pair of the shaping grooves 22A and 24A. By using the mold 4, heat and pressure are applied to the elongated structures 28A and 28B to advance the cross-linking reaction of the rubber for bonding the ends of the elongated structures 28A and 28B. In this way elongated structures 30 are completed.

Each of the shaping cavities of the mold 4 may also be used to join two ends of an elongated structure formed of rubber to form an endless loop structure, e.g., an O-ring. By considering the two elongated structures 28A and 28B described above as both ends of a single elongated structure and by considering the longer elongated structure 30 as a loop structure, a person skilled in the art will appreciate the process of forming the loop structure.

As is apparent from FIGS. 3 and 4, each of the shaping cavities formed by a pair of shaping grooves 22A and 24A is a cylindrical space having open ends. In an environment in which there is air around the mold 4, air intrudes into the shaping cavities, and the rubber materials 27 and the elongated structures 28A and 28B are exposed to air. In this embodiment, the step of cross-linking of rubber in the rubber materials 27 and the elongated structures 28A and 28B is conducted under a depressurized and degassed environment to process and bond the rubber utilizing peroxide cross-linking, which is likely to be prevented by oxygen.

As shown in FIG. 1, a lower heating unit 10 is mounted on the upper surface of the platform 2. The lower heating unit 10 includes a central heating plate (central heating device) 32, two cooling plates (cooling devices) 34, two intermediate heating plates (intermediate heating devices) 36, and four heat shield plates 38 and 39.

The central heating plate 32 is, for example, a plate formed of metal, and heats the central portion of the mold 4 in the longitudinal direction. The heating principle of the central heating plate 32 may be induction heating or resistance heating.

Each cooling plate 34 is, for example, a plate formed of metal, and cools one of the longitudinal end portions of the mold 4. Although not shown, a pipeline through which a refrigerant (e.g., water) circulates is formed inside each cooling plate 34.

Each intermediate heating plate 36 is, for example, a plate formed of metal, and heats an intermediate portion between the longitudinal central portion and one of the longitudinal end portions of the mold 4. The heating principle of the intermediate heating plates 36 may be induction heating or resistance heating.

Heat shield plates 38 are interposed between the center heating plate 32 and the intermediate heating plates 36, whereas heat shield plates 39 are also interposed between the intermediate heating plates 36 and the cooling plates 34. Each heat shield plate is a plate formed of a heat insulating material.

A lower supporting plate 40 is mounted on the lower heating unit 10, so as to be laterally slidable with respect to the lower heating unit 10, whereas the lower mold 24 is fixed to the lower supporting plate 40.

On the other hand, the upper mold 22 is fixed to the upper supporting plate 41 so as to face the lower mold 24. A pressurizing cylinder 12 is disposed above the upper supporting plate 41.

The pressurizing cylinder 12 is, for example, a hydraulic cylinder or a pneumatic cylinder, and has a cylinder head 13 that can be moved up and down. An upper heating unit 8 is fixed to the lower surface of the cylinder head 13.

The upper heating unit 8 includes a central heating plate (central heating device) 42, two cooling plates (cooling devices) 44, two intermediate heating plates (intermediate heating devices) 46, and four heat shield plates 48 and 49.

The central heating plate 42 is, for example, a plate formed of metal, and heats the central portion of the mold 4 in the longitudinal direction. The heating principle of the central heating plate 42 may be induction heating or resistance heating.

Each cooling plate 44 is, for example, a plate formed of metal, and cools one of the longitudinal end portions of the mold 4. Although not shown, a pipeline through which a refrigerant (e.g., water) circulates is formed inside each cooling plate 44.

Each intermediate heating plate 46 is, for example, a plate formed of metal, and heats an intermediate portion between the longitudinal central portion and one of the longitudinal end portions of the mold 4. The heating principle of the intermediate heating plates 46 may be induction heating or resistance heating.

Heat shield plates 48 are interposed between the center heating plate 42 and the intermediate heating plates 46, whereas heat shield plates 49 are also interposed between the intermediate heating plates 46 and the cooling plates 44. Each heat shield plate is a plate formed of a heat insulating material.

In the process of manufacturing the elongated structures 28, the central heating plates 32 and 42 heat the longitudinal central portion of each rubber material 27, the cooling plates 34 and 44 cool the longitudinal end portions of each rubber material 27, and the intermediate heating plates 36 and 46 heat the intermediate portions between the longitudinal central portion and the end portions of each rubber material 27. On the other hand, in the process of joining the elongated structures 28A and 28B, the central heating plates 32 and 42 heat the ends of the elongated structures 28A and 28B to be bonded, the cooling plates 34 and 44 cool the longitudinal central portions of the elongated structures 28A and 28B, and the intermediate heating plates 36 and 46 heat the intermediate portions of the longitudinal central portions and the end portions of the elongated structures 28A and 28B.

Heating of the central heating plates 32 and 42 and the intermediate heating plates 36 and 46 is controlled by a control device 50. For example, the control device 50 controls the supply current or supply voltage to the central heating plates 32 and 42 and the intermediate heating plates 36 and 46. In the process of manufacturing the elongated structure 28 and the process of bonding the elongated structures 28A and 28B, the set temperature of the central heating plates 32 and 42 is, for example, 170 to 190 degrees Celsius, whereas the set temperature of the intermediate heating plates 36 and 46 is, for example, 120 to 140 degrees Celsius.

The control device 50 may control the cooling of the cooling plates 34 and 44. For example, the control device 50 may control the flow rate of the refrigerant in the cooling plates 34 and 44. In the process of manufacturing the elongated structure 28 and the process of joining the elongated structures 28A and 28B, the temperature of the refrigerant in the cooling plates 34 and 44 is, for example, 30 degrees Celsius, and the assumed temperature of the cooling plates 34 and 44 is, for example, 53 degrees Celsius.

The upper supporting plate 41 is laterally slidable with respect to the upper heating unit 8.

When the cylinder head 13 of the pressurizing cylinder 12 is lowered, the upper heating unit 8 is brought into contact with the upper surface of the upper supporting plate 41, and then the upper mold 22 is combined with the lower mold 24, so that the rubber materials 27 or the elongated structures 28A and 28B are pressed by the mold 4. The heating units 8 and 10 heat the mold 4. Therefore, in the process of manufacturing the elongated structures 28, the cross-linking of the rubber at the longitudinal central portion of the elongated structure 28 is advanced, and in the process of joining the elongated structures 28A and 28B, the cross-linking of the rubber at the end portions of the elongated structures 28A and 28B is advanced. Thus, in the process of manufacturing the elongated structure 28, the pressurizing cylinder 12 presses the rubber materials 27 with the use of the heated mold 4 in the containment space 20, and promotes the shaping of the elongated structures 28A by the mold 4 while proceeding the cross-linking of the rubber to cure the longitudinal central portions of the elongated structures 28. In the process of joining the elongated structures 28A and 28B, the pressurizing cylinder 12 presses the elongated structures 28A and 28B with the use of the heated mold 4 in the containment space 20 to proceed the cross-linking of the rubber, thereby bonding the ends of the elongated structures 28A and 28B. The central heating plates 32 and 42, the cooling plates 34 and 44, the intermediate heating plates 36 and 46, and the heat shield plates 38, 39, 48, and 49 of the heating units 8 and 10 provide a suitable temperature distribution to multiple portions of the mold 4, and thus, to multiple portions of the rubber materials 27 and the elongated structures 28A and 28B. As a result, in the process of manufacturing the elongated structures 28, the cross-linking of the rubber is advanced at the longitudinal central portion of the elongated structure 28, but the cross-linking of the rubber at the end portions is restrained, and at the same time, the temperature difference between the longitudinal central portion and the end portion of the elongated structure 28 is restrained from becoming excessive, thereby reducing the occurrence of abnormalities of the elongated structures 28, such as deformation, sticking, and/or foaming. On the other hand, in the process of joining the elongated structures 28A and 28B, the cross-linking of the rubber is advanced at the ends of the elongated structures 28A and 28B to be bonded, but the cross-linking of the rubber can be restrained in other portions.

In order to position the upper supporting plate 41 with respect to the lower supporting plate 40 when the upper mold 22 approaches the lower mold 24, a positioning pin, i.e., knock pin 51, is fixed to the lower surface of the upper supporting plate 41, whereas a cylindrical knock-pin bush 52 is fixed to the upper surface of the lower supporting plate 40. When the upper supporting plate 41 is lowered, the knock pin 51 is inserted into the hole of the knock-pin bush 52 to appropriately position the upper supporting plate 41 with respect to the lower supporting plate 40. Conversely, the knock pin 51 may be fixed to the lower supporting plate 40, whereas the knock-pin bush 52 may be fixed to the upper supporting plate 41.

Additionally, a coil spring 54 is attached to the lower surface of the upper supporting plate 41 or the upper surface of the lower supporting plate 40. When the cylinder head 13 is raised, so that the force for pressing the upper supporting plate 41 downward is removed, the coil spring 54 urges the upper supporting plate 41 away from the lower supporting plate 40, thereby separating the upper mold 22 away from the lower mold 24.

The cylinder head 13 of the pressurizing cylinder 12, the upper heating unit 8, the upper supporting plate 41, the upper mold 22, the lower mold 24, the lower supporting plate 40, and the lower heating unit 10 are located in the internal space of the housing 6. That is to say, they are disposed inside the containment space 20 when the housing 6 is lowered. The containment space 20 is depressurized and degassed by the degassing pump 14, so that the step of cross-linking of the rubber of the rubber material 27 and the elongated structures 28A and 28B is executed under a depressurized and degassed environment. The entirety of the pressurizing cylinder 12 may be disposed in the internal space of the housing 6, or the actuator portion of the pressurizing cylinder 12 may be disposed outside the housing 6.

Figure 5:
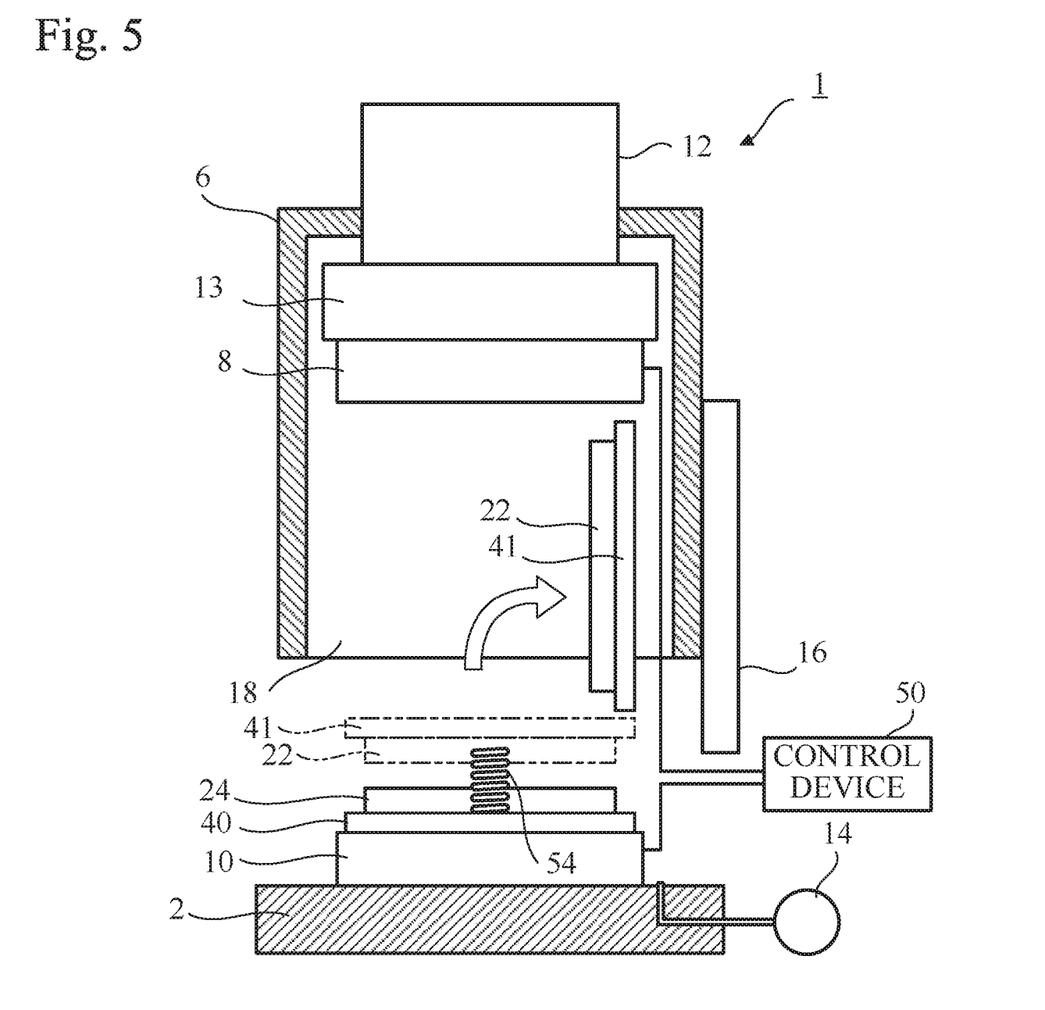
FIG. 5 is a side view showing an example of a method of use of the processing apparatus.

As shown in FIG. 5, the upper mold 22 and the upper supporting plate 41 can rotate 90 degrees. For this purpose, the upper mold 22 and the upper supporting plate 41 are attached to a hinge device (not shown).

Next, a method of manufacturing the elongated structures 28 and a method of joining the elongated structures 28A and 28B with the use of the processing apparatus 1 will be described. The method of joining the elongated structures 28A and 28B may also be referred to as a method of manufacturing longer elongated structures 30.

First, the rubber materials 27 in a state in which the cross-linking is not sufficient are prepared. The primary rubber material that is the primary raw material of the rubber material 27 may be any one of cross-linkable elastomers, for example, fluororubber, ethylene-propylene-diene rubber, isoprene rubber, silicone rubber, high-saturated nitrile rubber, styrene-butadiene rubber, chlorosulfonated polyethylene, acrylic rubber, and urethane rubber. The primary rubber material may include a resin component.

In this embodiment, the cross-linking agent added to the rubber material is a peroxide cross-linking agent, and may be, for example, any one of, or a combination of, 1,3-bis(t-butylperoxyisopropyl)benzene, 2,5-dimethyl-2,5-di(t-butylperoxy)oxy) hexyne-3, dicumyl peroxide, 2,4-dichlorobenzoyl peroxide, benzoyl peroxide, 2,5-dimethyl-2,5-dibenzoylperoxyhexane, n-butyl 4,4-di(t-butylperoxy) valerate, t-butylperoxybenzoate, di(t-butylperoxy) diisopropylbenzene, t-butylcumyl peroxide, 2,5-dimethyl-2,5-di(t-butylperoxy)hexane, di-t-butyl peroxide, and 2,5-dimethyl-5-di(t-butylperoxy)hexine-3. Other additives may be added to the primary rubber material.

Next, as shown in FIG. 5, with the housing 6 lifted from the platform 2 by the elevating device 16, the prepared rubber material 27 is placed in each of the shaping grooves 24A of the lower mold 24, as shown in FIG. 3. At this stage, the upper mold 22 and the upper supporting plate 41 are oriented vertically, as shown by solid lines in FIG. 5.

Next, the upper mold 22 and the upper supporting plate 41 are oriented horizontally as shown by the phantom lines in FIG. 5. Then, the elevating device 16 is activated to lower the housing 6 to provide a containment space 20 that is isolated from the outside by means of the housing 6 and the platform 2 as shown in FIGS. 1 and 2.

Next, the degassing pump 14 is activated to decompress and as the interior of the containment space 20.

Next, the pressurizing cylinder 12 is activated to lower the cylinder head 13, the upper heating unit 8, and the cooling plate 9. In the course of the descent, the upper heating unit 8 comes into contact with the upper supporting plate 41 to begin to lower the upper supporting plate 41 and the upper mold 22, and then, the knock pin 51 enters the knock-pin bush 52 to align the position of the upper supporting plate 4:1 to the lower supporting plate 40 appropriately. Furthermore, the positioning pins 24B of the lower mold 24 enter the holes of the upper mold 22 (see FIG. 3) to align the position of the upper mold 22 appropriately with respect to the lower mold 24.

Thus, as the cylinder head 13 descends, the upper mold 22 is combined with the lower mold 24, whereas the rubber materials 27 are located in the shaping cavities formed by the pairs of shaping grooves 22A and 24A. With the use of the mold 4, pressure is applied to the rubber materials 27, and the cross-linking of the rubber is promoted by a high temperature at the longitudinal central portion of each rubber material 27, whereas the cross-linking of the rubber is restrained by a low temperature at the longitudinal end portions of each rubber material 27, thereby completing the elongated structures 28. However, by virtue of the appropriate temperature distribution, the difference between the temperature at the longitudinal central portion and that at the end portions of the rubber material 27 is restrained from becoming excessive, thereby reducing the occurrence of abnormalities of the elongated structure 28, such as deformation, sticking, and/or foaming.

Heating of the heating plates 32, 36, 42, and 46 of the heating units 8 and 10 for providing heat to the rubber materials 27 may be started before placing the rubber material 27 in each of the forming grooves 24A of the lower mold 24 (for example, the heating plates 32, 36, 42, and 46 may be preheated). In order to suitably achieve the peroxide cross-linking reaction, the containment space 20 is preferably depressurized and degassed, and the longitudinal central portion of each rubber m material 27 is controlled to have a temperature suitable for the cross-linking reaction. For example, after the upper mold 22 is combined with the lower mold 24, the temperature of the heating plates 32, 36, 42, and 46 may be increased.

Pressurization and heating of the rubber materials 27 are performed for a predetermined period of time, and after lapse of the predetermined period of time, the pressurizing cylinder 12 is activated to raise the cylinder head 13. At this time, the positioning pins 24B are released from the holes of the upper mold 22 by the repulsive force of the coil spring 54 (see FIG. 3), and the knock pin 51 is released from the knock-pin bush 52. Thus, the upper mold 22 is separated from the lower mold 24 and the elongated structures 28.

The elevating device 16 is then activated to lift the housing 6 away from the platform 2, as shown in FIG. 5.

Next, the upper mold 22 and the upper supporting plate 41 are oriented vertically as shown by the solid lines in FIG. 5. Thereafter, the completed elongated structures 28 are removed from the lower mold 24.

Next, in order to make it easier to join ends of the elongated structures 28A and 28B, the ends of the elongated structures 28A and 28B are cut obliquely as shown in FIG. 4. Next, as shown in FIG. 5, with the housing 6 lifted from the platform 2 by the elevating device 16, the elongated structures 28A and 28B are placed in each of the shaping grooves 24A of the lower mold 24, as shown in FIG. 4. At this stage, the upper mold 22 and the upper supporting plate 41 are oriented vertically as shown by the solid lines in FIG. 5.

Next, the upper mold 22 and the upper supporting plate 41 are oriented horizontally, as shown by phantom lines in FIG. 5. Then, the elevating device 16 is activated to lower the housing 6 to provide a containment space 20 that is isolated from the outside by means of the housing 6 and the platform 2 as shown in FIGS. 1 and 2.

Next, the degassing pump 14 is activated to decompress and degas the interior of the containment space 20.

Next, the pressurizing cylinder 12 is activated to lower the cylinder head 13, the upper heating unit 8, and the cooling plate 9. In the course of the descent, the upper heating unit 8 comes into contact with the upper supporting plate 41 to begin to lower the upper supporting plate 41 and the upper mold 22, and then, the knock pin 51 enters the knock-pin bush 52 to align the position of the upper supporting plate 41 to the lower supporting plate 40 appropriately. Furthermore, the positioning pins 24B of the lower mold 24 enter the holes of the upper mold 22 (see FIG. 4) to align the position of the upper mold 22 appropriately with respect to the lower mold 24.

Thus, as the cylinder head 13 descends, the upper mold 22 is combined with the lower mold 24, whereas the pairs of the elongated structures 28A and 28B are located in the shaping cavities formed by the pairs of shaping grooves 22A and 24A. With the use of the mold 4, a pressure is applied to the pairs of the elongated structures 28A and 28B, and the cross-linking of the rubber is promoted by a high temperature at the longitudinal end portions of the elongated structures 28A and 28B to join the elongated structures 28A and 28B, thereby completing longer elongated structures 30. On the other hand, at the longitudinal central portions of the elongated structures 28A and 28B, the cross-linking of the rubber is restrained by a low temperature.

Heating of the heating plates 32, 36, 42, and 46 of the heating units 8 and 10 for providing heat to the elongated structures 28A and 28B may be started before placing the elongated structures 28A and 28B in each of the forming grooves 24A of the lower mold 24 (for example, the heating plates 32, 36, 42, and 46 may be preheated). In order to suitably achieve the peroxide cross-linking, the containment space 20 is preferably depressurized and degassed, and the ends of the elongated structures 28A and 28B are controlled to have a temperature suitable for the cross-linking reaction. For example, after the upper mold 22 is combined with the lower mold 24, the temperature of the heating plates 32, 36, 42, and 46 may be increased.

Pressurization and heating of the elongated structures 28A and 28B are performed for a predetermined period of time, and after expiration of the predetermined period of time, the pressurizing cylinder 12 is activated to raise the cylinder head 13. At this time, the positioning pins 24B are released from the holes of the upper mold 22 by the repulsive three of the coil spring 54 (see FIG. 4), and the knock pin 51 is released from the knock-pin bush 52. Thus, the upper mold 22 is separated from the lower mold 24 and the elongated structures 30.

The elevating device 16 is then activated to lift the housing 6 away from the platform 2, as shown in FIG. 5.

Next, the upper mold 22 and the upper supporting plate 41 are oriented vertically as shown by the solid lines in FIG. 5. Thereafter, the completed elongated structures 30 are removed from the lower mold 24.

Figure 6:
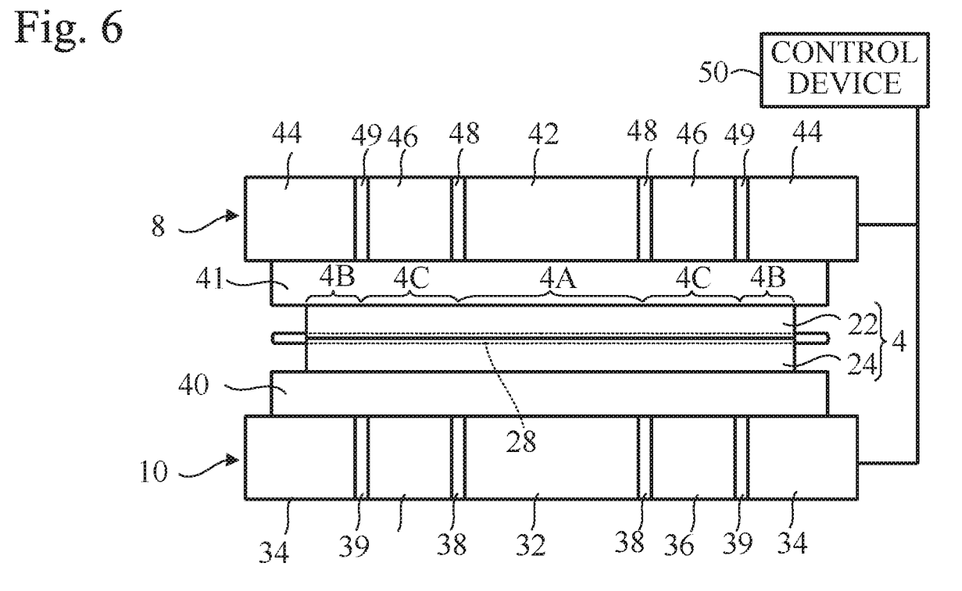
FIG. 6 is a schematic view showing an example of a manufacturing procedure of an elongated structure.

FIG. 6 is a schematic view showing an example of a manufacturing procedure of the elongated structure 28. In FIG. 6, only a part of the processing apparatus 1 for elongated structures is shown.

According to the above-described manufacturing method, it is possible to manufacture from the rubber material 27 the elongated structure 28, in which both ends are in an uncross-linked state and the longitudinal central portion is in a cross-linked state. In this process, since the cross-linking proceeds by a high temperature at the longitudinal central portion of the rubber material 27, the longitudinal central portion of the elongated structure 28 is hardened, but since the cross-linking does not proceed by a low temperature in the longitudinal end portions of the rubber material 27, the cross-linking is insufficient at the longitudinal end portions of the elongated structure 28. Next, in order to make it easier to join ends of the elongated structures 28, the ends of the elongated structure 28 are cut obliquely, as shown in FIG. 4.

Figure 7:
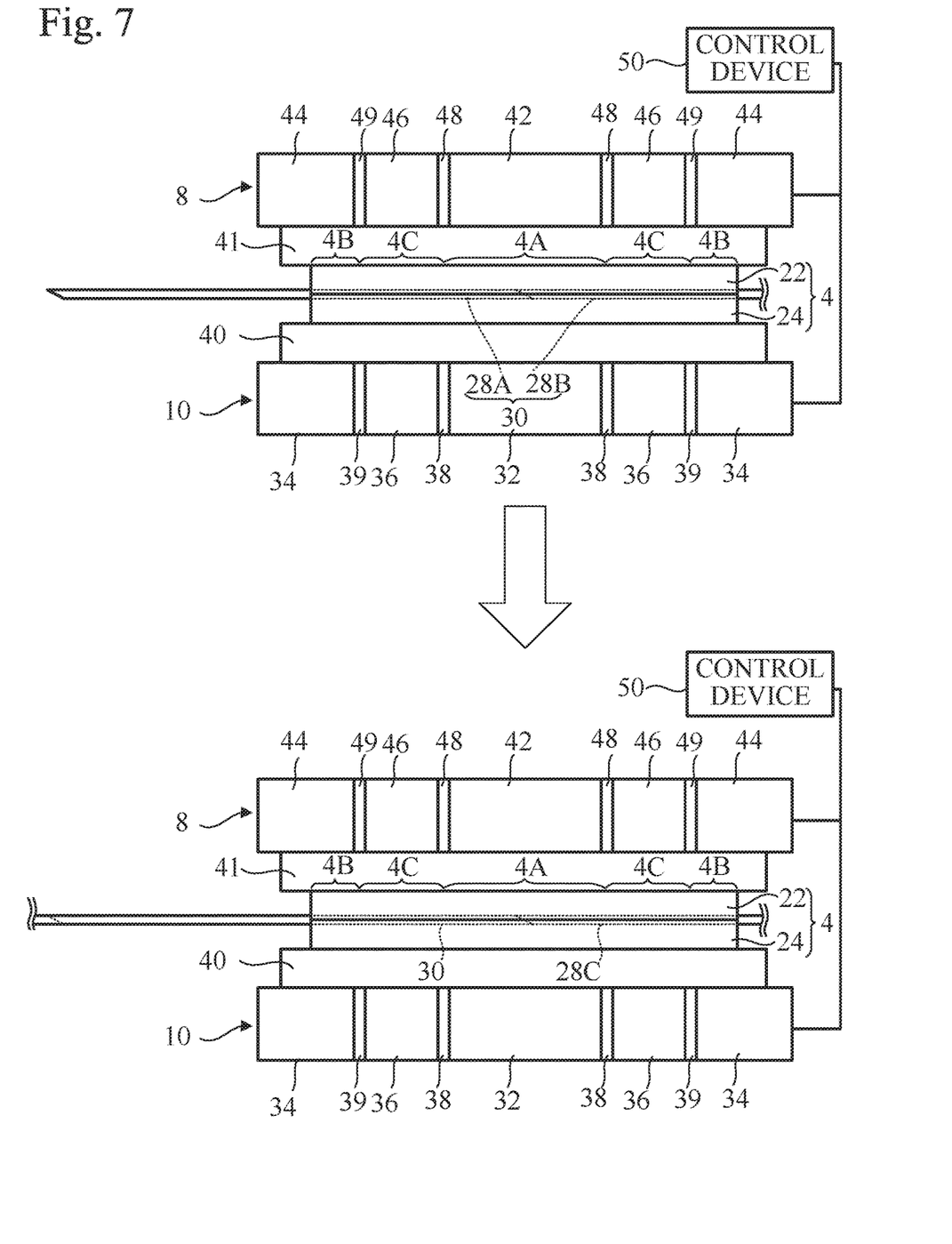
FIG. 7 is a schematic view showing an example of a bonding procedure of elongated structures.

FIG. 7 is a schematic view showing an example of a joining procedure of an elongated structure. In FIG. 7, only a part of the processing apparatus 1 fix; elongated structures is shown.

First, according to the above-described joining method, as shown in the upper part of FIG. 7, ends of the two elongated structures 28A and 28B are joined to form a longer elongated structure 30. In this step, since the cross-linking proceeds at the joined end portions of the elongated structures 28A and 28B, the longitudinal end portions of the elongated structures 28A and 28B are joined, and since the cross-linking does not proceed at the longitudinal central portions of the elongated structures 28A and 28B due to a low temperature, excessive cross-linking is restrained. At the longitudinal central portions of the elongated structures 28A and 28B, cross-linking has already progressed due to a high temperature in the manufacturing process of the elongated structures 28, and therefore, if the longitudinal central portions are heated again, cross-linking of the longitudinal central portions progresses excessively. Excessive cross-linking of the rubber can lead to problems, such as hardening and deformation, which are undesirable.

Next, with the upper mold 22 separated from the lower mold 24, the elongated structure 30 is moved in the longitudinal direction of the mold 4 with respect to the mold 4. Then, as shown in the lower part of FIG. 7, an end of another elongated structure 28C are brought into close proximity to, e.g., contact with, an end of the elongated structures 30, and the ends of the two elongated structures 28C and 30 are joined according to the above-described joining method to form a longer elongated structure.

Thus, an elongated structure composed of three elongated structures is formed. Hereinafter, an elongated structure e.g., the elongated structures 28A, 28B, and 28C) used as a material for a longer elongated structure is referred to as a segment, and a longer elongated structure (e.g., the elongated structure 30) formed by bonding is referred to as a combination. Such a process may be repeated to form a combination of four or more segments. Although not shown, two ends of a combination of multiple segments may be joined to form an endless loop.

The ends of the segments to be joined should be maintained at a suitable high temperature and portions other than the ends should be maintained at a suitable low temperature.

In this embodiment, the longitudinal central portion 4A of the mold 4 is heated by the central heater plates 32 and 42. The longitudinal central portion 4A of the mold 4 heats and shapes the longitudinal central portion of the elongated structure 28 in the manufacturing process of the elongated structure 28, and heats and bonds the ends of the elongated structures 28A and 28B in the bonding process of the elongated structures 28A and 28B. The two longitudinal end portions 4B of the mold 4 are cooled by multiple cooling plates 34 and 44. The two longitudinal end portions 4B of the mold 4 cool and shape the longitudinal end portions of the elongated structures 28 in the manufacturing process of the elongated structures 28, and cool the longitudinal central portions of the elongated structures 28A and 28B in the joining process of the elongated structures 28A and 28B. Furthermore, the two intermediate portions 4C between the longitudinal central portion 4A and the longitudinal end portions 4B of the mold 4 are heated by multiple intermediate heating plates 36 and 46 differing from the central heating plates 32 and 42 at a lower temperature than that of the central heating plates 32 and 42.

In the upper heating unit 8, the heat shield plates 48 are disposed between the center heating plate 42 and the intermediate heating plates 46, whereas the heat shield plates 49 are also disposed between the cooling plates 44 and the intermediate heating plates 46. In the lower heating unit 10, the heat shield plates 38 are disposed between the center heating plate 32 and the intermediate heating plates 36, whereas the heat shield plates 39 are also disposed between the cooling plate 34 and the intermediate heating plates 36. It is thus possible to provide a suitable temperature distribution to multiple portions of the mold 4, and thus, to multiple portions of the elongated structure.

Heating of the central heating plates 32 and 42 and the intermediate heating plates 36 and 46 is controlled by the control device 50 so as to provide a suitable temperature distribution to multiple portions of the mold 4, and thus, to multiple portions of the elongated structure. Cooling of the cooling plates 34 and 44 may also be controlled by the control device 50.

Preferably, in the longitudinal direction of each of the heating units 8 and 10, a temperature distribution is achieved in which the temperature decreases stepwise from the center to the ends. For example, in a case in which the temperature of the central heating plates 32 and 42 is set to 180 degrees Celsius, in which the temperature of the intermediate heating plates 36 and 46 is set to 130 degrees Celsius, and in which the temperature of the refrigerant in the cooling plates 34 and 44 is set to 30 degrees Celsius, the temperature of the boundaries between the central heating plates 32 and 42 and the heat shield plates 38 and 48 is 162 degrees Celsius, the temperature at the boundaries between the heat shield plates 38 and 48 and the intermediate heating plates 36 and 46 is 144 degrees Celsius, the temperature at the boundaries between the intermediate heating plates 36 and 46 and the heat shield plates 39 and 49 is 105 degrees Celsius, the temperature of the boundaries between the heat shield plates 39 and 49 and the cooling plates 34 and 44 is 85 degrees Celsius, and the temperature of the cooling plates 34 and 44 is 53 degrees Celsius. In this embodiment, the intermediate heating plates 36 and 46 and the heat shield plates 38, 48, 39, and 49 achieve a favorable stepwise temperature distribution and stably maintain the favorable stepwise temperature distribution.

Although the present invention has been shown and described with reference to a preferred embodiment thereof, it will be understood by those skilled in the art that various changes in form and details may be made therein without departing from the scope of the invention as defined by the claims. Such variations, alterations, and modifications are intended to be encompassed in the scope of the present invention.

For example, in the embodiment described above, peroxide cross-linking is utilized to cross-link the rubber material. However, the mode of cross-linking is not limited thereto, and sulfur cross-linking, bismaleimide cross-linking, quinoid cross-linking, phenolic resin cross-linking, azo cross-linking, bisazide cross-linking, epoxy cross-linking, bipolar compound cross-linking, amine cross-linking, or other cross-linking may be utilized. When a scheme is adopted in which cross-linking is advanced regardless of the presence of air, the rubber processing environment does not have to be degassed.

In the embodiment described above, the elongated structure 28 having a circular cross section is manufactured, and ends of the elongated structures 28A and 28B having a circular cross section are joined to manufacture the elongated structure 30. However, an elongated structure having a D-shaped cross-section may be manufactured, ends of the elongated structures having a D-shaped cross-section may be joined, and finally an endless D-ring may be manufactured. An elongated structure having an X-shaped cross-section may be manufactured, and ends of the elongated structure having an X-shaped cross-section may be joined, and finally an endless X-ring may be manufactured. Elongated structures of other cross-sectional shapes may be manufactured and joined.

In the embodiment described above, the mold 4 has multiple shaping cavities composed of multiple shaping grooves 22A and 24A, and it is possible to manufacture multiple elongated structures or loop structures simultaneously. However, a mold having a single shaping cavity may be used to produce only one elongated structure or loop structure at a time.

In the embodiment described above, the heating units 8 and 10 have a uniform thickness. However, the heating units 8 and 10 may have an uneven thickness distribution in order to provide a suitable temperature distribution.

In the embodiment described above; each of the heating units 8 and 10 has two intermediate heating plates. However, each heating unit may be provided with more intermediate heating plates, and heat shield plates may be provided between these intermediate heating plates.

In the embodiment described above, each heating device has a shape of plate, i.e., the central heating plates 32 and 42 and the intermediate heating plates 36 and 46. Each cooling device also has a plate shape, i.e., the cooling plates 34 and 44. However, all or some of these may have other shapes, for example, pipelines.

In the embodiment described above, the processing device 1 for elongated structures includes an upper heating unit 8 and a lower heating unit 10, each heating unit including a central heating device, cooling devices, intermediate heating devices, and heat shield plates. However, one of the upper heating unit 8 and the lower heating unit 10 need not be provided. Alternatively, one heating unit may have a central heating device, cooling devices, intermediate heating devices, and heat shield plates, and the other heating unit may have different elements.

REFERENCE SYMBOLS

1: Processing apparatus for elongated structures
4: Mold
4A: Longitudinal central portion
4B: Longitudinal end portion
4C: Intermediate portion
8: Upper heating unit
10: Lower heating unit
12: Pressurizing cylinder (pressure device)
22: Upper mold
24: Lower mold
27: Rubber material
28, 28A, 28B: Elongated structure
30: Elongated structure
32, 42: Central heating plate (central heating device)
34, 44: Cooling plate (cooling device)
36, 46: Intermediate heating plate (intermediate heating device
38, 39, 48, 49: Heat shield plate
50: Control device

What is claimed is:

1. An apparatus for processing an elongated structure, comprising:
    a mold within which an uncross-linked rubber material is to be placed;
    at least one heating unit configured to heat the mold; and
    a press configured to press the rubber material using the mold heated by the heating unit to promote shaping the rubber material by the mold while proceeding cross-linking of the rubber material,
    the heating unit comprising a central heating device configured to heat a longitudinal central portion of the mold, multiple cooling devices configured to cool two longitudinal end portions of the mold, multiple intermediate heating devices configured to heat two intermediate portions between the longitudinal central portion and the longitudinal end portions of the mold, heat shield plates disposed between the central heating device and the intermediate heating devices, and heat shield plates disposed between the cooling devices and the intermediate heating devices.

2. The apparatus for processing an elongated structure according to claim 1, further comprising a controller configured to control heating of the central heating device and the intermediate heating devices.

3. A method of manufacturing an elongated structure using the processing apparatus according to claim 2, comprising:
    placing the uncross-linked rubber material within the mold; and
    molding an elongated structure from the rubber material while pressurizing the rubber material within the mold by the press,
    molding the elongated structure comprising heating the longitudinal central portion of the mold by the central heating device to heat a longitudinal central portion of the rubber material, heating the intermediate portions of the mold by the intermediate heating devices, which is controlled at a temperature lower than a temperature of the central heating device, to heat the rubber material, and cooling the longitudinal end portions of the mold by the cooling devices to cool the longitudinal end portions of the mold to cool longitudinal end portions of the rubber material.

4. The method of claim 3, further comprising:
    placing two segments, each of which is obtained by molding the elongated structure, within the mold, such that an end of a segment and an end of the other segment are adjacent to each other; and
    joining the segments while pressurizing the segments within the mold by the press,
    joining the segments comprising heating the longitudinal central portion of the mold by the central heating device to heat the ends of the two segments, heating the intermediate portions of the mold by the intermediate heating devices, which is controlled at a temperature lower than a temperature of the central heating device, to heat the two segments, and cooling the longitudinal end portions of the mold by the cooling devices to cool longitudinal central portions of the two segments by the cooling devices.

5. A method of manufacturing an elongated structure using the processing apparatus according to claim 1, comprising:
    placing the uncross-linked rubber material within the mold; and
    molding an elongated structure from the rubber material while pressurizing the rubber material within the mold by the press,
    molding the elongated structure comprising heating the longitudinal central portion of the mold by the central heating device to heat a longitudinal central portion of the rubber material, heating the intermediate portions of the mold by the intermediate heating devices, which is controlled at a temperature lower than a temperature of the central heating device, to heat the rubber material, and cooling the longitudinal end portions of the mold by the cooling devices to cool the longitudinal end portions of the mold to cool longitudinal end portions of the rubber material.

6. The method of claim 5, further comprising:
placing two segments, each of which is obtained by molding the elongated structure, within the mold, such that an end of a segment and an end of the other segment are adjacent to each other; and
joining the segments while pressurizing the segments within the mold by the press,
joining the segments comprising heating the longitudinal central portion of the mold by the central heating device to heat the ends of the two segments, heating the intermediate portions of the mold by the intermediate heating devices, which is controlled at a temperature lower than a temperature of the central heating device, to heat the two segments, and cooling the longitudinal end portions of the mold by the cooling devices to cool longitudinal central portions of the two segments by the cooling devices.

* * * * *